US008741253B2

(12) United States Patent
Brausch et al.

(10) Patent No.: US 8,741,253 B2
(45) Date of Patent: Jun. 3, 2014

(54) PROCESS FOR PREPARING HIGHER HYDRIDOSILANES

(75) Inventors: Nicole Brausch, Recklinghausen (DE); Andre Ebbers, Bochum (DE); Guido Stochniol, Haltern am See (DE); Martin Trocha, Essen (DE); Yücel Önal, Erlenbach (DE); Jörg Sauer, Dülmen (DE); Bernhard Stützel, Marl (DE); Dorit Wolf, Oberursel (DE); Harald Stüger, Graz (AT)

(73) Assignee: Evonik Degussa GmbH, Essen (DE)

( * ) Notice: Subject to any disclaimer, the term of this patent is extended or adjusted under 35 U.S.C. 154(b) by 752 days.

(21) Appl. No.: 12/999,151

(22) PCT Filed: May 25, 2009

(86) PCT No.: PCT/EP2009/056277
§ 371 (c)(1),
(2), (4) Date: Mar. 9, 2011

(87) PCT Pub. No.: WO2010/003729
PCT Pub. Date: Jan. 14, 2010

(65) Prior Publication Data
US 2011/0189072 A1    Aug. 4, 2011

(30) Foreign Application Priority Data
Jun. 17, 2008  (EP) ................... 08158401

(51) Int. Cl.
*C01B 33/04* (2006.01)
(52) U.S. Cl.
USPC .......................... 423/347; 423/324
(58) Field of Classification Search
USPC ......................... 423/347, 344, 324
See application file for complete search history.

(56) References Cited

U.S. PATENT DOCUMENTS

| 4,900,861 | A  | 2/1990  | Yokoyama et al. |
| 4,965,386 | A  | 10/1990 | Watson et al. |
| 5,252,766 | A  | 10/1993 | Sakakura et al. |
| 5,304,622 | A  | 4/1994  | Ikai et al. |
| 6,746,653 | B2 | 6/2004  | Bauer et al. |
| 7,332,619 | B2 | 2/2008  | Korth et al. |
| 7,339,067 | B2 | 3/2008  | Korth et al. |
| 7,385,092 | B2 | 6/2008  | Osterholt et al. |
| 8,039,646 | B2 | 10/2011 | Bade et al. |
| 8,246,925 | B2 | 8/2012  | Schwarz et al. |
| 2007/0128098 | A1 | 6/2007 | Mayer |
| 2007/0207501 | A1 | 9/2007 | Wolf et al. |
| 2008/0064905 | A1 | 3/2008 | Krimmer et al. |
| 2009/0259063 | A1 | 10/2009 | Lang et al. |
| 2010/0105945 | A1 | 4/2010 | Wolf et al. |
| 2010/0160649 | A1 | 6/2010 | Lang et al. |
| 2010/0179340 | A1 | 7/2010 | Lang et al. |
| 2010/0185004 | A1 | 7/2010 | Lang et al. |
| 2011/0046332 | A1 | 2/2011 | Breiner et al. |
| 2011/0189072 | A1 | 8/2011 | Brausch et al. |
| 2012/0042951 | A1 | 2/2012 | Stuetzel et al. |
| 2012/0199832 | A1 | 8/2012 | Stuetzel et al. |
| 2012/0205654 | A1 | 8/2012 | Stuetzel et al. |
| 2013/0095026 | A1 | 4/2013 | Oenal et al. |
| 2013/0099164 | A1 | 4/2013 | Stochniol et al. |
| 2013/0168824 | A1 | 7/2013 | Wieber et al. |

FOREIGN PATENT DOCUMENTS

| EP | 0 314 327 | 5/1989 |
| EP | 0 551 771 | 7/1993 |

OTHER PUBLICATIONS

U.S. Appl. No. 13/498,206, filed Mar. 26, 2012, Brausch, et al.
U.S. Appl. No. 13/504,331, filed Apr. 26, 2012, Wieber, et al.
U.S. Appl. No. 13/123,827, filed Apr. 12, 2011, Brausch, et al.
U.S. Appl. No. 13/574,376, filed Jul. 20, 2012, Wieber, et al.
U.S. Appl. No. 13/510,373, filed Jul. 12, 2012, Wieber, et al.
U.S. Appl. No. 13/989,823, filed May 28, 2013, Wieber, et al.
U.S. Appl. No. 13/824,641, filed Mar. 18, 2013, Wieber, et al.
U.S. Appl. No. 13/991,261, filed Jun 3, 2013, Stenner, et al.
U.S. Appl. No. 13/885,316, filed May 14, 2013, Stenner, et al.
U.S. Appl. No. 13/991,986, filed Jun. 6, 2013, Brausch, et al.
U.S. Appl. No. 13/522,514, filed Sep. 26, 2012, Stochniol, et al.
U.S. Appl. No. 13/816,569, filed May 16, 2013, Latoschinski, et al.
U.S. Appl. No. 13/988,029, filed May 17, 2013, Becker, et al.
U.S. Appl. No. 13/977,984, filed Jul. 2, 2013, Schladerbeck, et al.
Veprek, S. et al., "The Mechanism of Plasma-Induced Deposition of Amorphous Silicon From Silane", 6052 Plasma Chemistry and Plasma Processing, vol. 10, No. 1, pp. 3-26, XP000101898, (Mar. 1, 1990).
Bourg, S. et al., "New Stable Titanocene and Zirconocene Catalyst Precursors for Polysilane Synthesis Via Dehydrocoupling of Hydrosilanes", Organometallics, vol. 14, No. 1, pp. 564-566, XP002508775 (1995).
International Search Report issued Dec. 11, 2009 in PCT/EP09/056277 filed May 25, 2009.
U.S. Appl. No. 13/807,852, filed Dec. 31, 2012, Stuetzel, et al.
U.S. Appl. No. 14/005,413, filed Sep. 16, 2013, Oenal, et al.
U.S. Appl. No. 14/005,360, filed Sep. 16, 2013, Oenal, et al.
U.S. Appl. No. 14/005,979, filed Sep. 18, 2013, Wehner, et al.
U.S. Appl. No. 14/007,495, filed Sep. 25, 2013, Wehner, et al.
U.S. Appl. No. 14/088,721, filed Nov. 25, 2013, Omeis, et al.

*Primary Examiner* — Edward Johnson
(74) *Attorney, Agent, or Firm* — Oblon, Spivak, McClelland, Maier & Neustadt, L.L.P.

(57) ABSTRACT

Process for preparing higher hydridosilanes of the general formula H—$(SiH_2)_n$—H where n≥2, in which—one or more lower hydridosilanes—hydrogen, and—one or more transition metal compounds comprising elements of transition group VIII of the Periodic Table and the lanthanides are reacted at a pressure of more than 5 bar absolute, subsequently depressurized and the higher hydridosilanes are separated off from the reaction mixture obtained.

18 Claims, No Drawings

PROCESS FOR PREPARING HIGHER HYDRIDOSILANES

The invention relates to a process for preparing higher hydridosilanes by means of a dehydropolymerization reaction of lower hydridosilanes. The invention further relates to the use of the higher hydridosilanes as starting material for the preparation of silicon.

The dehydropolymerization of lower hydridosilanes to form higher hydridosilanes is a promising route to silicon. For the purposes of the invention, hydridosilanes are compounds which contain only silicon and hydrogen atoms and have a linear, branched or cyclic structure containing Si—H bonds. Examples which may be mentioned are monosilane, disilane, trisilane, cyclopentasilane.

U.S. Pat. No. 4,965,386 discloses a process in which hydridic cyclopentadienyl complexes of scandium, yttrium or the rare earths are used as catalyst. It is found in practice that this is a suitable process for preparing alkylsilanes and arylsilanes, i.e. compounds which have at least one carbon-silicon bond. In the case of higher hydridosilanes, on the other hand, this process does not give economically acceptable yields.

The same is found for the process disclosed in U.S. Pat. No. 5,252,766, in which alkylsilanes and arylsilanes are converted in the presence of cyclopentadienyl complexes of the lanthanides into the corresponding polyalkylsilanes or polyarylsilanes. In contrast, the use of lower hydridosilanes does not lead to appreciable amounts of the desired higher hydridosilanes. Rather, undesirable, polymeric solids which can be spontaneously flammable are formed.

JP 02-184513 discloses a process in which the products are disilane, trisilane or a mixture of the two is obtained from monosilane by means of a transition metal-catalyzed reaction. The process does not lead to the formation of higher silanes.

U.S. Pat. No. 6,027,705 discloses a thermal process for preparing higher hydridosilanes from monosilane or lower hydridosilanes. The process is said to lead to higher hydridosilanes at temperatures above room temperature. In practice, temperatures of more than 300° C. are necessary to achieve appreciable conversions. A disadvantage of this process is the high thermal stress which promotes secondary and decomposition reactions.

Various processes for preparing higher hydridosilanes, which are based on the dehydropolymerization of lower hydridosilanes, are thus known. The reaction is carried out either thermally or in the presence of transition metal catalysts. However, the known processes are not suitable for the economical preparation of the products. Spontaneously flammable by-products which make the work-up difficult and contaminate the products are often formed.

It was therefore an object of the present invention to provide a process which allows the economical preparation of higher hydridosilanes and largely avoids the disadvantages of the prior art.

The invention provides a process for preparing higher hydridosilanes of the general formula H—$(SiH_2)_n$—H where $n \geq 2$, in which
  one or more lower hydridosilanes
  hydrogen, and
  one or more transition metal compounds comprising elements of transition group VIII of the Periodic Table and the lanthanides
are reacted at a pressure of more than 5 bar absolute, subsequently depressurized and the higher hydridosilanes are separated off from the reaction mixture obtained.

For the purposes of the invention, lower hydridosilanes encompass monosilane ($SiH_4$) or mixtures containing monosilane together with proportions of higher hydridosilanes. The proportion of higher hydridosilanes can be up to 60 mol %, in general from 5 to 20 mol %, based on the mixture. For availability reasons, preference is given to using monosilane.

Higher hydridosilanes encompass, for the purposes of the invention, mixtures of hydridosilanes of the formula H—$(SiH_2)_n$—H, where $n \geq 2$. The mixtures usually contain higher hydridosilanes where $2 \leq n \leq 20$, but depending on the reaction conditions, higher hydridosilanes in which $n > 20$ can also be obtained. Preference is given to a mixture where $2 \leq n \leq 20$, with particular preference being given to a mixture where $2 \leq n \leq 10$. Such a mixture generally contains $Si_2H_6$, $Si_3H_8$, n-$Si_4H_{10}$, n-$Si_5H_{12}$, n-$Si_6H_{14}$ as main components, possibly together with n-$Si_7H_{16}$, n-$Si_8H_{18}$, n-$Si_9H_{20}$ and n-$Si_{10}H_{22}$ as secondary components.

Further secondary constituents can be branched hydridosilanes, for example, i-$Si_6H_{14}$, or cyclic hydridosilanes, for example cyclopentahydridosilane (cyclo-$Si_5H_{10}$). The total proportion of the secondary constituents can be up to a maximum of 10% by weight, generally up to a maximum of 5% by weight, preferably up to a maximum of 2% by weight, in each case based on the sum of the hydridosilanes and the secondary components. These values are based on estimates since calibration substances are not available for all secondary constituents.

A further essential starting material in the process of the invention is hydrogen. Hydrogen can be introduced into the reaction vessel either separately or together with the lower hydridosilanes. It has been found that the presence of hydrogen leads to higher yields of higher hydridosilanes and reduces or completely prevents the formation of solid. The formation of solid is undesirable, inter alia, because it often ignites spontaneously during the work-up of the reaction mixture and thus represents a considerable safety risk. The precise structure of this solid is not yet known.

The proportion of hydrogen is initially not limited. It depends on the starting materials, lower hydridosilanes and catalysts, and on the reaction conditions, pressure and temperature. The partial pressure of hydrogen is 5-200% of the pressure of the hydridosilanes used. In general, the proportion of hydrogen is selected so that the partial pressure of hydrogen corresponds to at least 5% of the total pressure. Preference is given to a range from 5% to 80%, particularly preferably to a range from 15% to 50%.

Furthermore, it is also possible to use inert gases such as nitrogen, argon or helium for diluting the reaction mixture.

A further essential constituent of the process of the invention is one or more transition meal compounds comprising elements of transition group VIII of the Periodic Table, namely Fe, Co, Ni, Ru, Rh, Pd, Re, Os, Ir, Pt, and the lanthanides, namely Ce, Pr, Nd, Pm, Sm, Eu, Gd, Tb, Dy, Ho, Er, Tm, Yb, Lu.

The transition metal compounds are generally used in the form of a precursor. The ligand is added separately, so that the catalyst is formed in situ. However, it is also possible to use commercially available catalysts.

Suitable precursors which are used are, for example, metal salts such as chlorides, bromides, iodides, fluorides, acetates, acetylacetonates, sulphates, sulphonates, nitrates, phosphates, trifluoromethane-sulphonates, alcoxides, hexafluorophosphates, carbonyls, carboxylates or metal precursors in which M=Fe, Co, Ni, Ru, Rh, Pd, Re, Os, Ir, Pt, and the lanthanides, namely Ce, Pr, Nd, Pm, Sm, Eu, Gd, Tb, Dy, Ho, Er, Tm, Yb, Lu.

M(COD)$_x$ where COD=1,5-cyclooctadiene,

M(C$_8$H$_{12}$)(C$_5$H$_7$O$_2$), where C$_8$H$_{12}$=1,5-cyclooctadiene and

C$_5$H$_7$O$_2$=acetylacetonato

M(CO)x(C$_5$H$_7$O$_2$), where C$_5$H$_7$O$_2$=acetylacetonato metal carbonyls, MCl(CO)x, [MClx(CO)y]$_2$, M(allyl)Cl, MCl(C$_7$H$_8$), where C$_7$H$_8$=norbornadiene M(C$_8$H$_{12}$)$_2$(BF$_4$)$_x$, where C$_8$H$_{12}$=1,5-cyclooctadiene M(C$_7$H$_8$)$_2$(BF$_4$)$_x$, where C$_7$H$_8$=norbornadiene

[M(1,5-C$_8$H$_{12}$)Cl]$_2$, where 1,5-C$_8$H$_{12}$=1,5-cyclooctadiene

M(Cp)$_2$, where Cp=unsubstituted or alkyl-substituted cyclopentadienyl

M(C$_4$H$_7$)$_2$(C$_8$H$_{12}$), where C$_4$H$_7$=methylallyl and C$_8$H$_{12}$=1,5-cyclooctadiene, [M(O$_2$CCH$_3$)x]$_2$ where (O$_2$CCH$_3$)=acetate, where M is in each case the transition metal. x depends on the valency of the transition metal.

The ligands of the transition metal compounds can preferably be halogen, hydrogen, alkyl, aryl, alkylsilanes, arylsilanes, olefin, alkylcarboxyl, arylcarboxyl, acetylacetonatoalkoxyl, aryloxy, alkylthio, arylthio, substituted or unsubstituted cyclopentadienyl, cyanoalkane, aromatic cyano compounds, CN, CO, NO, alkylamine, arylamines, pyridine, alkylphosphine, arylphosphine, alkylarylphosphine, alkyl phosphites, aryl phosphites, alkylstibane, arylstibane, alkylarylstibane, alkylarsane, arylarsane or alkylarylarsane.

Particularly preferred ligands are: bipyridyl, unsubstituted or substituted cyclopentadienyl, cyclooctadiene, CN, CO, alkylphosphine, arylphosphines, alkyl or aryl phosphites, alkylarylphosphine, bidentate phosphine ligands having bridging heterocycles or bridging aryl radicals, a heteroatom-containing ligand, particularly preferably a phosphorus-containing ligand, which has the ability to produce atropisomerism in respect of two aryl or hetaryl systems, alkyldiphosphine R$^2$R$^1$—P(CH$_y$)$_x$P—R$^3$R$^4$ where R$^1$, R$^2$, R$^3$ and R$^4$ are each, independently of one another alkyl or aryl and x=1-10 and y=0, 1 or 2, R$^2$R$^1$—P—CR$^5$R$^6$(CR$^7$R$^8$)x-CR$^9$R$^{10}$—P—R$^3$R$^4$ where R$^1$, R$^2$, R$^3$, R$^4$, R$^5$, R$^6$, R$^7$, R$^8$, R$^9$, R$^{10}$ are each, independently of one another H, alkyl or aryl and x=1-10; R$^1$—C≡C—R$^2$, where R$^1$ and R$^2$ are each, independently of one another, alkylphosphines or arylphosphines.

As commercially available catalysts, it is possible to use, for example, bis(cyclopentadienyl)nickel (nickelocene), bis(cyclopentadienyl)titanium dichloride, bis(cyclopentadienyl)zirconium dichloride (zirconocene dichloride), 1,1'-bis(diphenylphosphino)ferrocene, bis(triphenylphosphine)nickel(II)chloride, carbonyl(dihydrido)tris(triphenylphosphine) ruthenium (II), carbonylchlorohydridotris(triphenylphosphine) ruthenium (II), chlorotris(triphenylphosphine)rhodium(I), (Wilkinson catalyst), dimethylbis(t-butylcyclopentadienyl)zirconium, bis(triphenylphosphine)nickel dicarbonyl.

For example, it is possible to use the following compounds: Ni[Ph$_2$P(CH$_2$)$_3$PPh$_2$]Me$_2$, Ni[Ph$_2$P(CH$_2$)$_3$PPh$_2$]Cl$_2$, Ni(PPh$_3$)$_2$Me$_2$, Ni(PPh$_3$)$_2$Cl$_2$, Ni(PMe$_2$Ph)$_2$Me$_2$, Ni(COD)$_2$, NiEt$_2$, Ni(CNMe)(CO)$_3$, Ni(Cp)Cl$_2$, Ni(Cp)I$_2$, Ni(Cp)NO, Ni(CF$_3$C≡CCF$_3$)(CO)$_2$, Ni(Cp)(CN)$_2$, Ni(Cp)(CO)I, Ni(πCH$_2$=CHCH$_2$)$_2$, Ni(Cp)(CO)CF$_3$, Ni(NCCH=CHCN)$_2$, Ni(Cp)(CO)C$_2$F$_5$, Ni(cyclooctatetraen), Ni(Cp)(πCH=CHCH$_2$), Ni(EtNC)$_2$(CN)$_2$, Ni(MeNC)$_4$, Ni(Cp)(PPh$_3$)Cl, Ni(CH$_2$=CH$_2$)(PEt$_3$)$_2$, Ni(Cp)(PPh$_3$)Et, Ni[Ph$_2$P(CH$_2$)$_2$PPh$_2$]BrMe, Ni[PhP(CH$_2$)$_3$PPh$_2$]BrMe, Ni(CH2=cH2)(PPh$_3$)$_2$, Ni(AN)(PPh$_3$), (πCH$_2$=CHCH$_2$)NiCl)$_2$, (πCH$_2$=CHCH$_2$NiBr)$_2$, [Ni(Cp)(CO)]$_2$, [Ni(Cp)]$_2$HC≡CH, [Ni(Cp)$_2$HC≡CCH$_3$, [Ni(Cp)]$_2$CH$_3$C≡CCH$_3$, Ni(dip)Cl$_2$, Ni(dip)Br$_2$, Ni(dip)ClMe, Ni(dip)Me$_2$, Ni(dip)Et$_2$, NiCp$_2$, Ni(CO)$_4$, Ni(AN)$_2$, Ni(acac)$_2$, Ni[Ph$_2$P(CH$_2$)$_3$PPh$_2$PhClMe, Ni[Ph$_2$P(CH$_2$)$_3$PPh$_2$]Br$_2$, Ni[Ph$_2$P(CH$_2$)$_3$PPh$_2$]Et$_2$, Ni[Ph$_2$P(CH$_2$)$_3$PPh$_2$]H$_2$, Ni(PPh$_3$)$_2$ClMe, Ni(PPh$_3$)$_2$HMe, Co(PPh$_3$)$_2$Me$_2$, Co(PPh$_3$)$_2$Cl$_2$, CO$_2$(CO)$_8$, Co[Ph$_2$P(CH$_2$)$_2$PPh$_2$]Me$_2$, Co(PPh$_3$)$_2$Br$_2$, Co(PPh$_3$)$_2$BrMe, Co(PPh$_3$)$_2$ClMe, Co(PPh$_3$)$_2$Et$_2$, Co[Ph$_2$P(CH$_2$)$_3$PPh$_2$]Me$_2$, Co[Ph$_2$P(CH$_2$PPh$_2$]ClMe, Co[Ph$_2$P(CH$_2$)$_3$PPh$_2$]Cl$_2$, Co[Ph$_2$P(CH$_2$)$_3$PPh$_2$]ClMe, Co(CO)$_4$Me, Co(Cp)Cl$_2$, Co(Cp)Me$_2$, Co(πCH$_2$=CHCH$_2$)(CO)$_3$, Co(Cp)(CO)$_2$, Co(Cp)$_2$, [Co(Cp$_2$]Br$_3$, [Co(Cp)$_2$]Cl, Co(PPh$_3$)(CO)$_3$Me, Co(PPh$_3$)$_2$H$_2$, Co(PPh$_3$)$_2$Br$_2$, Pd(PPh$_3$)$_2$Me$_2$, Pd(PPh$_3$)$_2$Cl$_2$, Pd(PPh$_3$)$_2$ClMe, Pd(PPh$_3$)$_2$H$_2$, Pd(PPh$_3$)$_2$Et$_2$, Pd(PPh$_3$)$_2$Br$_2$, Pd(PPh$_3$)$_2$BrMe, Pd(PPh$_3$)$_2$I$_2$, Pd(Cp)Br, Pd(Cp)Cl, Pd(AN)$_2$Cl$_2$, Pd(πCH$_2$=CHCH$_2$)$_2$, Pd(πCH$_2$=CHCH$_2$)$_2$Cl$_2$, Pd(Cp)(πCH$_2$=CHCH$_2$), Pd(COD)Cl$_2$, Pd(COD)Me$_2$, Pd(COD)ClMe, Pd(dip)Me$_2$, Pd(PEt$_3$)$_2$CNMe, Pd(Pet$_3$)$_2$Me$_2$, Pd(pMeOC$_6$H$_4$)$_2$Br$_2$, Pd[Ph$_2$P(CH$_2$)$_2$PPh$_2$]Me$_2$, Pd[Ph$_2$P(CH$_2$)$_3$PPh$_2$]Me$_2$, [Pd(πCH$_2$=CHCH$_2$)Cl]$_2$, [Pd(πCH$_2$=CHCH$_2$)Br]$_2$, Ru(PPh$_3$)$_3$Me$_2$, Ru(PPh$_3$)$_3$Cl, Ru(PPh$_3$)$_3$ClMe, Ru(PPh$_3$)$_3$Br$_2$, RU(PPh$_3$)$_3$Et$_2$, RU(PPh$_3$)$_2$, ClMe$_2$, Ru(PPh$_3$)$_3$H$_2$, Ru(Cp)(CO)$_2$H, Ru(COD)Cl$_2$, Ru(Cp)(CO)$_2$Me, RU(COD) Br$_2$, RU(MeNC)$_4$Cl$_2$, Ru(Cp)(CO)$_2$Et, Ru(Cp)$_2$, Ru[Ph$_2$P(CH$_2$)$_2$PPh$_2$]$_2$ClMe, Ru[Ph$_2$P(CH$_2$)$_3$PPh$_2$]$_2$ClMe, Ru[Ph$_2$P(CH$_2$)$_2$PPh$_2$]$_2$ClPh, Ru(EtNC)$_4$Cl$_2$, Ru(EtNC)$_4$Br$_2$, Ru(EtNC)$_4$Me$_2$, Ru(EtNC)$_4$Et$_2$, Ru[Ph$_2$P(CH$_2$)$_3$PPh$_2$]$_2$BrMe, Ru[Ph$_2$P(CH$_2$)$_2$PPh$_2$]$_2$HMe, [Ru(Cp)(CO)$_2$]$_2$, Ir(PPh$_3$)$_3$(CO)Me, Ir(PPh$_3$)$_3$(CO)H, Ir(Cp)(CO)$_2$, Ir(Cp)$_2$Br$_3$, Ir(PPh$_3$)$_3$Me$_2$, Ir (PPh$_3$)$_3$Cl$_2$, Ir(PPh$_3$)$_3$ClMe, Ir(PPh$_3$)$_3$H$_2$, Ir(Ph$_2$P(CH$_2$)$_2$PPh$_2$]Me$_2$, Ir[Ph$_2$P(CH$_2$)$_2$PPh$_2$](CO)Me, Ir(PPh$_3$)$_2$(CO)MeClI, Ir(πCH$_2$=CHCH$_2$)(PPh$_3$)$_2$Cl$_2$, Ir[p-CH$_3$C$_4$H$_6$NC)$_4$Cl, Ir(acac)(COD).

In these formulae, COD=cyclooctadiene; Cp=cyclopentadienyl; dip=bipyridyl, Ph=phenyl, AN=acrylonitrile, acac=acetylacetonate; Py=pyridine; Me=methyl, Et=ethyl; Bu=butyl.

These transition metal compounds serve as catalysts. They can be used either as heterogeneous catalyst, if appropriate applied to a support, or as homogeneous catalyst dissolved in the reaction mixture.

The catalyst concentration can be from 0.0001 to 1 mol/l. A range from 0.001 to 0.1 mol/l can be preferred.

The best results are obtained using homogeneous catalysts. In this case, the transition metal compounds themselves can be added to the reaction mixture or the transition metal compounds are formed only in the reaction mixture by adding a transition metal compound, for example, an acetate, and a ligand separately to the reaction mixture.

In the second embodiment, a molar excess of the ligand is generally used. Here, the systems Bis(1,5-cyclooctadiene) nickel(0), 1,2-bis(diphenylphosphino)ethane; Bis(1,5-cyclooctadiene)nickel(0), trans-1,2-bis(diphenylphosphino) ethylene; Rhodium(II) acetate dimer, 2,2'-bis(diphenylphosphino)-1,1'-binaphthyl;

can be particularly useful.

The process of the invention is carried out at a pressure of at least 5 bar absolute. Preference is given to a range from 20 to 200 bar absolute. Below 20 bar absolute, the conversions are often not satisfactory, while above 200 bar absolute the outlay required to meet the demands on the materials is not justified.

The temperature at which the process of the invention is carried out is not critical. In general, the process can be carried out at temperatures of from −50° C. to 200° C. Preference is given to a range from 0° C. to 120° C. and particular preference is given to a range from 20° C. to 80° C.

The reaction time can range from a few hours to a number of days. The proportion of higher silanes increases with the reaction time.

The process of the invention can also be carried out in the presence of a solvent. Suitable solvents are in principle all solvents which react neither with the starting materials nor with the products and, if a homogeneous catalyst is used, dissolve this. Examples are aliphatic and aromatic hydrocarbons, for example, benzene or toluene, ethers such as dialkyl ethers, furans or dioxanes, and also dimethylformamide, ethyl acetate or butyl acetate.

The higher hydridosilanes can be separated off from the reaction mixture by the methods known to those skilled in the art. Thus, for example, solvent or unreacted starting material, for example, monosilane, can be separated off by distillation. It is also possible to use adsorptive processes.

The invention further provides the use of the higher hydridosilanes which can be obtained by the process according to the invention for producing silicon.

The invention further provides for the use of the higher hydridosilanes which can be obtained by the process of the invention for producing a charge-transporting constituent in optoelectronic and electronic components.

EXAMPLES

Catalyst solution: transition metal compound and a 1.1-fold molar excess of ligand are weighed out under protective gas (argon) and dissolved in 30 ml of dried toluene at room temperature.

The catalyst solution is placed in a stainless steel autoclave which is equipped with a glass liner, thermocouple, pressure sensor, liquid sampling point, gas inlet and gas outlet and has been made inert. An appropriate amount of monosilane is introduced into the autoclave via the gas inlet. The reactor is subsequently heated to the desired temperature and the stirrer is started (700 rpm). After a reaction time of 1 h, 20 h and 67 h, a liquid sample is taken and analyzed by gas chromatography.

Table 1 shows the starting materials, amounts of starting materials and reaction temperatures.

Table 2 shows the yields, in GC % by area, of the higher hydridosilanes obtained.

Comparative examples 15 and 16 are carried out analogously but without using hydrogen. Here, no higher hydridosilanes but only spontaneously flammable solids are formed.

TABLE 1

Starting materials and amounts of starting materials

| Ex. | | mg | $p_{SiH4}$ bar | $p_{H2}$ bar | T °C. |
|---|---|---|---|---|---|
| | According to the invention | | | | |
| 1 | Bis(1,5-cyclooctadiene)nickel(0) 1,2-bis(diphenylphosphino)ethane | 6.30 15.03 | 80 | 20 | 40 |
| 2 | Bis(1,5-cyclooctadiene)nickel(0) trans-1,2-bis(diphenylphosphino)ethylene | 6.09 10.00 | 80 | 20 | 40 |
| 3 | Rhodium(II) acetate dimer, (±)-2,2'-bis(diphenylphosphino)-1,1'-binaphthyl | 10.12 43.48 | 67 | 20 | 40 |
| 4 | Rhodium(II) acetate dimer, (±)-2,2'-bis(diphenylphosphino)-1,1'-binaphthyl | 11.18 34.75 | 67 | 20 | 40 |
| 5 | Rhodium(II) acetate dimer, (±)-2,2'-bis(diphenylphosphino)-1,1'-binaphthyl | 10.84 32.9 | 67 | 20 | 40 |
| 6 | Rhodium(II) acetate dimer, (±)-2,2'-bis(diphenylphosphino)-1,1'-binaphthyl | 11.67 36.28 | 67 | 30 | 40 |
| 7 | Rhodium(II) acetate dimer, (±)-2,2'-bis(diphenylphosphino)-1,1'-binaphthyl | 10.51 33.38 | 67 | 30 | 40 |
| 8 | Rhodium(II) acetate dimer, (±)-2,2'-bis(diphenylphosphino)-1,1'-binaphthyl | 11.45 33.04 | 65 | 5 | 40 |
| 9 | Nickel(II) acetylacetonate* Tricyclohexylphosphine | 6.65 30.38 | 60 | 20 | 40 |
| 10 | Nickel(II) acetylacetonate* [Tris(trimethylsilyl)]phosphine | 6 27.51 | 60 | 20 | 40 |
| 11 | Nickel(II) acetylacetonate* Triphenylphosphine | 7.23 38.67 | 60 | 20 | 40 |
| 12 | Nickel(II) acetylacetonate* 2,2-di-tert-butylphenyl phosphite | 6.38 67.48 | 60 | 20 | 40 |
| 13 | Nickel(II) acetylacetonate* Tri-t-butylphosphine | 8.01 23.89 | 60 | 20 | 40 |
| 14 | Nickel(II) acetylacetonate* (±)-2,2'-bis(diphenylphosphino)-1,1'-binaphthyl | 6.84 32.33 | 60 | 20 | 40 |
| | Comparative examples | | | | |
| 15 | Bis(1,5-cyclooctadiene)nickel(0) 1,2-bis(diphenylphosphino)ethane | 32.4 57.9 | 17 | 0 | 110 |
| 16 | Rhodium(II) acetate dimer, (±)-2,2'-bis(diphenylphosphino)-1,1'-binaphthyl | 49.7 112.1 | 20 | 0 | 110 |

*anhydrous

TABLE 2

Reaction products

| Ex. | Reaction time h | Disilane | Trisilane | Tetrasilane | Pentasilane | >$Si_nH_{(2n+2)}$ where n > 5 |
|---|---|---|---|---|---|---|
| | | | | GC % by area | | |
| | According to the invention | | | | | |
| 1 | 20 | 74.0 | 21.9 | 4.1 | 0.0 | 0.0 |
| 2 | 20 | 75.2 | 20.2 | 4.6 | 0.0 | 0.0 |
| 3 | 2.5 | 78.8 | 18.4 | 2.8 | 0.0 | 0.0 |
| | 67 | 62.2 | 21.8 | 8.7 | 7.3 | 0.0 |
| 4 | 2.5 | 81.4 | 16.2 | 2.4 | 0.0 | 0.0 |
| | 67 | 46.9 | 23.4 | 15.2 | 9.1 | 5.2 |
| 5 | 2.5 | 73.7 | 21.1 | 5.2 | 0.0 | 0.0 |
| | 67 | 50.4 | 24.6 | 14.5 | 7.8 | 2.8 |
| 6 | 2.5 | 73.6 | 21.2 | 5.2 | 0.0 | 0.0 |
| | 67 | 56.2 | 23.3 | 12.1 | 6.6 | 1.7 |
| 7 | 2.5 | 75.8 | 19.6 | 4.5 | 0.0 | 0.0 |
| | 67 | 49.4 | 25.2 | 14.5 | 7.8 | 3.1 |
| 8 | 2.5 | 66.5 | 25.8 | 7.7 | 0.0 | 0.0 |
| | 67 | 47.8 | 24.3 | 14.8 | 8.5 | 4.6 |
| 9 | 1 | 100.0 | 0.0 | 0.0 | 0.0 | 0.0 |
| | 20 | 100.0 | 0.0 | 0.0 | 0.0 | 0.0 |
| 10 | 1 | 96.6 | 0.0 | 3.4 | 0.0 | 0.0 |
| | 20 | 69.0 | 23.4 | 5.7 | 1.8 | 0.0 |
| 11 | 1 | 90.6 | 0.0 | 7.0 | 2.4 | 0.0 |
| | 20 | 66.1 | 28.6 | 4.0 | 1.3 | 0.0 |
| 12 | 1 | 56.1 | 0.0 | 43.9 | 0.0 | 0.0 |
| | 20 | 39.6 | 45.3 | 8.2 | 6.8 | 0.0 |
| 13 | 1 | 100.0 | 0.0 | 0.0 | 0.0 | 0.0 |
| | 20 | 71.2 | 24.7 | 4.1 | 0.0 | 0.0 |
| 14 | 1 | 33.0 | 33.0 | 18.7 | 10.3 | 4.9 |
| | 20 | 29.8 | 24.5 | 19.2 | 14.1 | 12.4 |
| | Comparative examples | | | | | |
| 15 | 20 | 0 | 0 | 0 | 0 | 0 |
| 16 | 20 | 0 | 0 | 0 | 0 | 0 |

The invention claimed is:

1. A process for preparing at least one higher hydridosilane of formula $$H—(SiH_2)_n—H,$$

wherein n≥2, the process comprising: (A) reacting
at least one lower hydridosilane,
hydrogen, and
at least one transition metal compound comprising at least one element of transition group VIII of the Periodic Table or the lanthanides,
at a pressure of more than 5 bar absolute;
(B) subsequently depressurizing to give a reaction mixture; and
(C) separating off the at least one higher hydridosilane from the reaction mixture obtained in (B).

2. The process according to claim 1, wherein monosilane is reacted.

3. The process according to claim 1, wherein a partial pressure of hydrogen corresponds to from 5% to 80% of total pressure.

4. The process according to claim 1, wherein the at least one transition metal is Co, Ir, Ni, Pd, Rh, or Ru.

5. The process according to claim 1, wherein the at least one transition metal compound comprises
bipyridyl, an unsubstituted or substituted cyclopentadienyl, cyclooctadiene, CN, CO, alkylphosphine, an arylphosphine, an alkyl or aryl phosphite, alkylarylphosphine, a bidentate phosphine ligand comprising a bridging heterocycle or bridging aryl radical, a heteroatom-containing ligand, alkyldiphosphine $R^2R^1—P(CH_y)_xP—R^3R^4$ wherein $R^1, R^2, R^3$ and $R^4$ are each, independently of one another, alkyl or aryl and x=1-10 and y=0, 1 or 2, $R^2R^1—P—CR^5R^6(CR^7R^8)x-CR^9R^{10}—P—R^3R^4$ wherein $R^1, R^2, R^3, R^4, R^5, R^6, R^7, R^8, R^9, R^{10}$ are each, independently of one another, H, alkyl or aryl and x=1-10; or $R^1—C≡C—R^2$, wherein $R^1$ and $R^2$ are each, independently of one another, an alkylphosphine, an arylphosphine, or a heteroatom-containing ligand,
as at least one ligand.

6. The process according to claim 1, wherein the pressure is from 20 to 200 bar absolute.

7. The process according to claim 1, wherein the temperature is from −50° C. to 200° C.

8. The process according to claim 1, carried out in the presence of a solvent which is a constituent of a liquid phase.

9. The process according to claim 2, wherein a partial pressure of hydrogen corresponds to from 5% to 80% of total pressure.

10. The process according to claim 2, wherein the at least one transition metal is Co, Ir, Ni, Pd, Rh, or Ru.

11. The process according to claim 3, wherein the at least one transition metal is Co, Ir, Ni, Pd, Rh, or Ru.

12. The process according to claim 9, wherein the at least one transition metal is Co, Ir, Ni, Pd, Rh, or Ru.

13. The process according to claim 2, wherein the at least one transition metal compound comprises
bipyridyl, an unsubstituted or substituted cyclopentadienyl, cyclooctadiene, CN, CO, alkylphosphine, an arylphosphine, an alkyl or aryl phosphite, alkylarylphosphine, a bidentate phosphine ligand comprising a bridging heterocycle or bridging aryl radical, a heteroatom-containing ligand, alkyldiphosphine $R^2R^1—P(CH_y)_xP—R^3R^4$ wherein $R^1, R^2, R^3$ and $R^4$ are each, independently of one another, alkyl or aryl and x=1-10 and y=0, 1 or 2, $R^2R^1—P—CR^5R^6(CR^7R^8)x-CR^9R^{10}—P—R^3R^4$ wherein $R^1, R^2, R^3, R^4, R^5, R^6, R^7, R^8, R^9, R^{10}$ are each, independently of one another, H, alkyl or aryl and x=1-10; or $R^1—C≡C—R^2$, wherein $R^1$ and $R^2$ are each, independently of one another, an alkylphosphine, an arylphosphine, or a heteroatom-containing ligand,
as at least one ligand.

14. The process according to claim 3, wherein the at least one transition metal compound comprises
bipyridyl, an unsubstituted or substituted cyclopentadienyl, cyclooctadiene, CN, CO, alkylphosphine, an arylphosphine, an alkyl or aryl phosphite, alkylarylphosphine, a bidentate phosphine ligand comprising a bridging heterocycle or bridging aryl radical, a heteroatom-containing ligand, alkyldiphosphine $R^2R^1—P(CH_y)_xP—R^3R^4$ wherein $R^1, R^2, R^3$ and $R^4$ are each, independently of one another, alkyl or aryl and x=1-10 and y=0, 1 or 2, $R^2R^1—P—CR^5R^6(CR^7R^8)x-CR^9R^{10}—P—R^3R^4$ wherein $R^1, R^2, R^3, R^4, R^5, R^6, R^7, R^8, R^9, R^{10}$ are each, independently of one another, H, alkyl or aryl and x=1-10; or $R^1—C≡C—R^2$, wherein $R^1$ and $R^2$ are each, independently of one another, an alkylphosphine, an arylphosphine, or a heteroatom-containing ligand,
as at least one ligand.

15. The process according to claim 9, wherein the at least one transition metal compound comprises
bipyridyl, an unsubstituted or substituted cyclopentadienyl, cyclooctadiene, CN, CO, alkylphosphine, an arylphosphine, an alkyl or aryl phosphite, alkylarylphosphine, a bidentate phosphine ligand comprising a bridging heterocycle or bridging aryl radical, a heteroatom-containing ligand, alkyldiphosphine $R^2R^1—P(CH_y)_xP—R^3R^4$ wherein $R^1, R^2, R^3$ and $R^4$ are each, independently of one another, alkyl or aryl and x=1-10 and y=0, 1 or 2, $R^2R^1—P—CR^5R^6(CR^7R^8)x-CR^9R^{10}—P—R^3R^4$ wherein $R^1, R^2, R^3, R^4, R^5, R^6, R^7, R^8, R^9, R^{10}$ are each, independently of one another, H, alkyl or aryl and x=1-10; or $R^1—C≡C—R^2$, wherein $R^1$ and $R^2$ are each, independently of one another, an alkylphosphine, an arylphosphine, or a heteroatom-containing ligand,
as at least one ligand.

16. The process according to claim 4, wherein the at least one transition metal compound comprises
bipyridyl, an unsubstituted or substituted cyclopentadienyl, cyclooctadiene, CN, CO, alkylphosphine, an arylphosphine, an alkyl or aryl phosphite, alkylarylphosphine, a bidentate phosphine ligand comprising a bridging heterocycle or bridging aryl radical, a heteroatom-containing ligand, alkyldiphosphine $R^2R^1—P(CH_y)_xP—R^3R^4$ wherein $R^1, R^2, R^3$ and $R^4$ are each, independently of one another, alkyl or aryl and x=1-10 and y=0, 1 or 2, $R^2R^1—P—CR^5R^6(CR^7R^8)x-CR^9R^{10}—P—R^3R^4$ wherein $R^1, R^2, R^3, R^4, R^5, R^6, R^7, R^8, R^9, R^{10}$ are each, independently of one another, H, alkyl or aryl and x=1-10; or $R^1—C≡C—R^2$, wherein $R^1$ and $R^2$ are each, independently of one another, an alkylphosphine, an arylphosphine, or a heteroatom-containing ligand,
as at least one ligand.

17. The process according to claim 10, wherein the at least one transition metal compound comprises
bipyridyl, an unsubstituted or substituted cyclopentadienyl, cyclooctadiene, CN, CO, alkylphosphine, an arylphosphine, an alkyl or aryl phosphite, alkylarylphosphine, a bidentate phosphine ligand comprising a bridging heterocycle or bridging aryl radical, a heteroatom-containing ligand, alkyldiphosphine $R^2R^1—P(CH_y)_xP—R^3, R^4$ wherein $R^1, R^2, R^3$ and $R^4$ are each, independently of one another, alkyl or aryl and x=1-10 and y=0, 1 or 2, $R^2R^1—P—CR^5R^6(CR^7R^8)x-CR^9R^{10}—P—R^3R^4$ wherein $R^1, R^2, R^3, R^4, R^5, R^6, R^7, R^8, R^9, R^{10}$ are each, independently of one another, H, alkyl or aryl and x=1-10; or $R^1—C\equiv C—R^2$, wherein $R^1$ and $R^2$ are each, independently of one another, an alkylphosphine, an arylphosphine, or a heteroatom-containing ligand, as at least one ligand.

18. The process of claim 1, wherein the at least one transition metal comprises at least one phosphorus-containing ligand, which produces atropisomerism in respect of two aryl or hetaryl systems, as a ligand.

\* \* \* \* \*